United States Patent [19]

Denison et al.

[11] Patent Number: 5,208,714

[45] Date of Patent: May 4, 1993

[54] MAGNETIC HYBRID INTERLEAVED HEAD WITH CLOSURE SUPPORTING ISLANDS

[75] Inventors: Edward V. Denison; Vincent N. Kahwaty; Gustave C. Stern; Gerald Steving; Robert P. Zammit, all of Tucson, Ariz.

[73] Assignee: International Business Machines Corporation, Armonk, N.Y.

[21] Appl. No.: 916,354

[22] Filed: Jul. 20, 1992

Related U.S. Application Data

[62] Division of Ser. No. 634,679, Dec. 26, 1990, Pat. No. 5,161,299.

[51] Int. Cl.⁵ .................. G11B 5/127; G11B 5/265
[52] U.S. Cl. ............................. 360/113; 360/121
[58] Field of Search .......................... 360/113, 121

[56] References Cited

U.S. PATENT DOCUMENTS

| 5,027,245 | 6/1991 | Nagata ................. 360/113 |
| 5,065,483 | 11/1991 | Zammit ............... 360/113 X |

FOREIGN PATENT DOCUMENTS

| 0131727 | 7/1983 | European Pat. Off. . |
| 0178898 | 10/1984 | European Pat. Off. . |
| 60050710 | 3/1985 | European Pat. Off. . |
| 0348169 | 12/1989 | European Pat. Off. . |

OTHER PUBLICATIONS

IBM Technical Disclosure Bulletin, vol. 24 No. 4, Sep. 1981 "Thin Film Magnetic Head Assembly".

*Primary Examiner*—A. J. Heinz
*Attorney, Agent, or Firm*—M. W. Schecter

[57] ABSTRACT

An interleaved head for reading and writing data transitions onto a magnetic tape. A magnetic recording system for the bi-directional transportation of the tape media across the interleaved head. A controller controls the tape drive in a reel-to-reel format to accomplish the bi-directional motion of the tape media. The interleaved head includes two modules with each module having a plurality of alternating read and write transducers alternately spaced apart along a single line placed transverse to the movement of the magnetic tape. The two modules are placed together such that the write gaps of one module are aligned with the read gaps of the other module. Each read module includes the magneto-resistive element. Each write transducer includes a thin film conductor driving a nickel zinc ferrite substrate as one pole piece and a nickel zinc closure piece as the second pole piece. In order to provide leveling across the write transducers of the module, write back gap islands are provided in the back gap regions of the write transducer made of the same material with the same thickness as the magneto resistive element and the conductors interconnecting the magneto resistive element to the read/write network of the tape drive.

25 Claims, 4 Drawing Sheets

MAGNETIC HYBRID INTERLEAVED HEAD WITH CLOSURE SUPPORTING ISLANDS

This is a Divisional Application of application Ser. No. 07/634,679 filed Dec. 26, 1990, now U.S. Pat. No. 5,161,299.

TECHNICAL FIELD

This invention relates generally to the field of magnetic recording, and more specifically to a drive wherein the magnetic media carries multiple parallel channels of data and to a transducer operable to sense the magnetic transitions from the media.

BACKGROUND OF THE INVENTION

Tape drives that operate bi-directionally are well-known. The tape media is generally enclosed into a single reel cartridge and the tape is transported around the tape path onto a tape reel thereby placing the tape media in contact with the transducer. The transducer in present day tape drives comprise a separate read and write element that cover each track of the data on the tape media. It is known, for instance, that a one-half inch wide magnetic tape can include 18 tracks. A higher number of tracks are contemplated and it is proposed that a one-half inch wide magnetic tape includes 36 tracks. To be able to read 36 tracks from the tape, an interleaved data transducing head is proposed.

An interleaved read/write head is disclosed in U.S. Pat. No. 4,685,005 to Fields, and assigned to the assignee of the present invention. In the magnetic head disclosed in that patent, the read and write gaps of each module of the magnetic head are alternately spaced across the width of the tape, such that the write gaps of one module are aligned with the read gaps of the other module. When one module is selected for writing, as a function of the direction of the tape movement, the other module is selected to read-after-write check the data written by the write element of the first module. One module writes odd track data during one direction of the tape movement and reads even track data during the opposite direction of the tape movement. The problem arises in that both read and write elements are located within one module with the gaps of each element aligned along the same line.

The read element of the modern day tape head is a magneto-resistive transducer and is formed of thin film layers deposited through a standard thin film deposition procedure. The write transducer, however, has its pole pieces formed from two blocks of magnetic ferrite magnetically connected together at the back gap and a transducing gap at the front face. A single block of magnetic ferrite operates as a closure structure after all of the elements of the read transducer and the write conductors are deposited onto the substrate magnetic ferrite block. Having different layers of material deposited at different locations into the side-by-side elements creates a leveling problem when the magnetic ferrite closure block is to be placed over the plurality of read and write elements. More layers form a greater thickness in the read element and therefore the write element generally lacks a supporting structure that can cause the magnetic ferrite closure piece to bend under stress when affixed to the completed transducers. In any event, the write head gap must not be narrower than the read head gap to properly read the written bits of information onto the magnetic media. Also, with the closure piece bent under stress at the time of manufacture, the stress may relieve in time, resulting in an unreliable gap.

It is, therefore, an object of the present invention to provide an enhanced magnetic recording drive for multi-track operation.

Yet another object of the present invention is to provide a magnetic drive that uses an enhanced interleaved head to read and write magnetic transitions forming data onto magnetic recording media.

Another object of the present invention, therefore, is to provide an enhanced transducer assembly and an enhanced method for making the transducer assembly.

SUMMARY OF THE INVENTION

The present invention provides a bi-directional media drive which uses an interleaved transducing head that solves the mechanical and magnetic problems between the gap lengths of the read and write elements.

The magnetic interleaved head according to the present invention includes two data transducing head modules.

Each of the head modules include one transducing gap line extending normal to the movement of the media. Each gap line includes a plurality of alternating write and read gaps. Each of the head modules includes a substrate made of a magnetic ferrite material. An insulating layer is deposited onto the substrate to prepare for the deposition of the read element films and the write conductor. A patterned magneto resistive layer forming the read transducer is then deposited onto the insulating layer. The magneto resistive layers also form read, write and back gap write islands adjacent to the read elements and adjacent to the proposed write elements. A patterned conductor layer is deposited on each magneto resistive layer to connect the magneto resistive portion of the read transducer for interconnection to the rest of the media drive. The pattern conductor layer is also deposited over the islands, namely, the read, write and back gap write islands. A patterned second insulating layer is deposited on each conductor layer such that the write track and the read leg regions are exposed. A read and a write conductor is deposited into each patterned write track region and read leg region. A read and a write interconnecting layer is deposited to connect each read and write conductor to the media drive, namely the data transmitting means which writes the magnetic transitions onto the media and senses or reads the written magnetic transitions from the media for use by the drive and the connecting data processing system. A magnetic ferrite closure piece covering all of the plurality of alternating write and read gaps of the head is affixed over the preceding layers. The magnetic ferrite closure forms one write pole piece and a read gap shield for the magneto-resistive read element while the substrate provides the second write pole piece. The read, write and back gap islands provide the mechanical support for the magnetic ferrite closure piece to produce a correct write gap length.

The media drive of the present invention, therefore, comprises an interleaved transducer as just described and means for moving the media past the interleaved transducer. The drive further includes means for transmitting the data to and receiving the data from the interleaved transducer.

By depositing an island of the read transducer material and the read conductor materials in the front and back gaps of the write track region and also in front of the read element in the read section, the film layers in both the read and write sections produce the same height in the various depositions. Therefore, when the closure is assembled to complete the head module, the gap length of the read and write transducers will be essentially the same, and no bending of the closure will occur.

In the present invention, therefore, the supporting structure of one module of a magnetic head having alternating read and write elements includes supporting islands adjacent each of the shorter lengths of either the write or read gaps. In the instant that the write gap lengths are shorter, the islands are placed adjacent each write element. In the instant that the read gap lengths are shorter, the islands are placed adjacent each read element. The supporting structure is preferably magnetic ferrite but could be a non magnetic ceramic. The supporting islands could be made of magnetic materials to enable the independent variations of the magnetic properties of the read or write gaps containing the islands, or the supporting islands could be made of the same materials that comprise the layers of the longer gap length element.

An object of the present invention, therefore, is to provide a media drive that includes an enhanced interleaved magnetic head.

Another object is to provide an interleaved head that minimizes the bending stress in the closure and hence provide a more stable and reliable length.

Still another object is to provide an interleaved head that has the read and write gap essentially of the same length.

Yet another object of the present invention is to provide an interleaved head for magnetic drives that includes islands of the material used in the formation of the read element in the front and back gap of the write element region and also in front of the read element in the read section such that the read and write sections are of the same height when the closure module forming the second pole piece of the write element is assembled over the module.

These and other objects of the present invention will become apparent to those skilled in the art as the description proceeds.

BRIEF DESCRIPTION OF THE DRAWINGS

The various novel features of this invention, along with the foregoing and other objects, as well as the invention itself both as to its organization and method of operation may be more fully understood from the following description of illustrated embodiments when read in conjunction with the accompanying drawings, wherein.

DETAILED DESCRIPTION OF THE EMBODIMENTS

Figure 1:
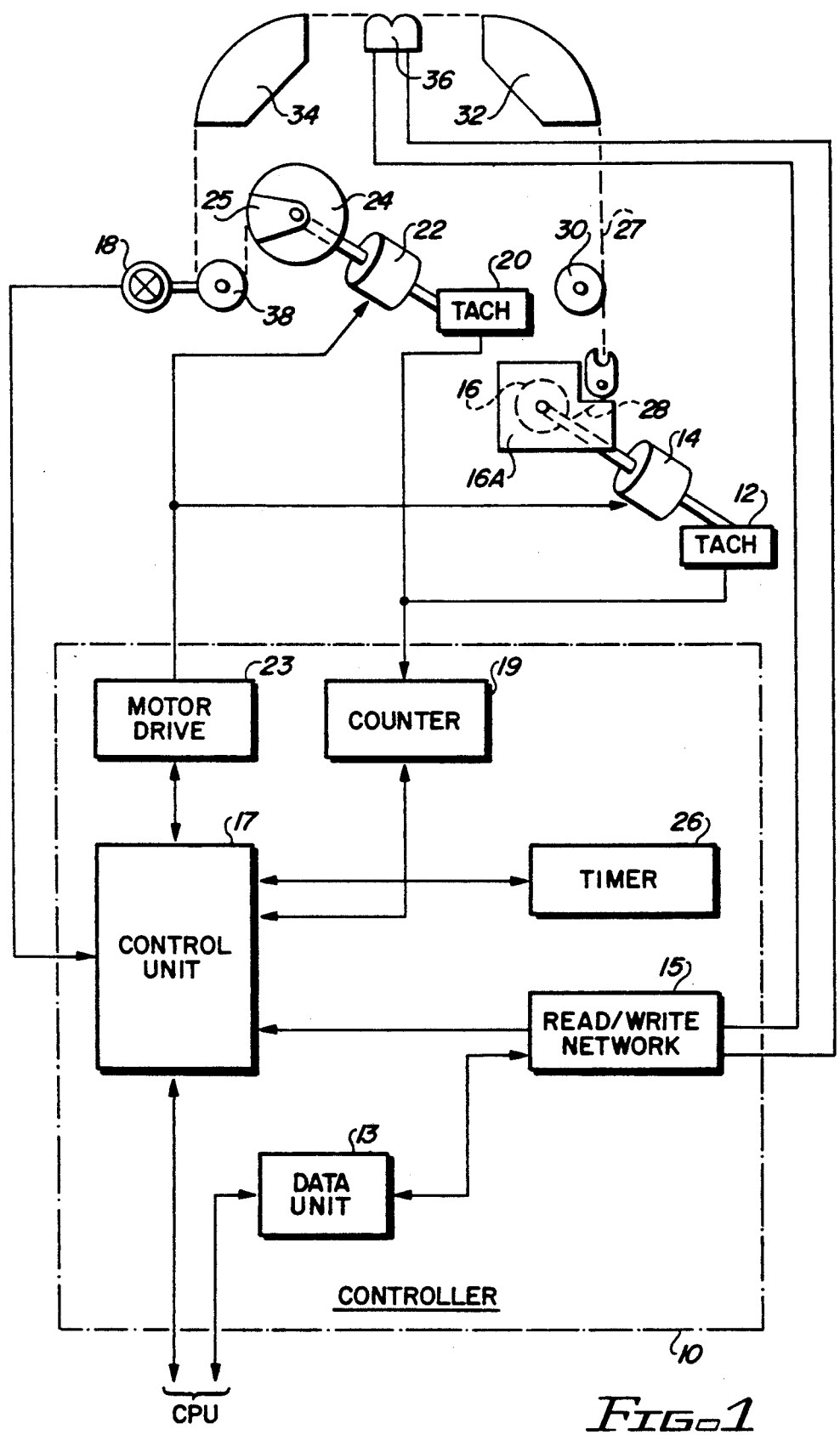
FIG. 1 is a schematic of a tape drive and controller useful with the magnetic head according to the present invention.

The present invention is preferable for use in an interleaved magnetic head. The interleaved magnetic head has its use to read and write magnetic transitions from a multi-track recording media. This in turn finds its major usage in tape drive systems. A typical tape drive system well known today is the IBM 3490 tape drive. In a tape drive system, the transducer generally remains fixed and the tape is moved across the transducer in both directions to read and write from various transducers in the magnetic head to record data information onto at least one of a plurality of tracks on the media. The interleaved head is of particular importance since the number of tracks can be increased while still providing the bi-directional operation of the media while also permitting an immediate read back check of the data just written onto the tape media. A schematic view of the entire tape drive system preferred in the embodiment of the present invention is shown in FIG. 1. Reference is made to the U.S. Pat. No. 4,125,881 to Eige, et al. and assigned to the assignee of the present invention for a more complete description of a control circuit usable for a reel-to-reel tape drive. Only the apparatus and procedure for an understanding of the present invention is given herein.

As shown in FIG. 1, a controller 10 accepts information from a supply reel tachometer 12 which is connected to a supply reel motor 14. The supply reel motor 14 is driven by a motor drive circuit 23 to reversibly rotate a supply reel 16 shown located within a single reel cartridge 16A. The tachometer 12 directs count pulses to a counter 19 to indicate the number of rotations and the rotational position of the motor 14 and the supply reel 16. The output of the counter 19 is directed to a control unit 17. Another input to the control unit 17 is via the counter 19 that accepts count pulses from a take up reel tachometer 20. The tachometer 20 is connected to a take up reel motor 22 that is reversibly driven by the motor drive 23 which applies torque under the control of the control unit 17. The motor 22 drives a take up reel 24. A timer 26 is connected to the control unit 17 in the controller 10 to control the application of a motor drive 23 power to the motors 14 and 22.

A magnetic tape 28 and its leader block 29 takes a path, shown by a dotted line 27, from the supply reel 16 to the take up reel 24 past an idler bearing 30, air bearing tape guides 32 and 34, and a magnetic head 36. The tape path 27 continues around a roller 38 of the tension arm transducer 18 to the take up reel 24. An example of a tape drive for threading the leader block 29 and the tape 28 through the complex tape path 27 is disclosed in U.S. Pat. No. 4,335,858 assigned to the assignee of the present invention. The transducer 36 is preferably an interleaved magnetic head such as is disclosed in the U.S. Pat. No. 4,685,005 to Fields. The disclosure in both of these Patents is incorporated herein by reference for a more detailed description of the preferred embodiment.

The output of the magnetic head 36 is connected to a read/write network 15. The read/write network 15, under control of the control unit 17, directs data to a data unit 13 in the read format, and accepts data from the data unit 13 when data is to be written onto the tape 28 by the magnetic head 36. The data unit 13 is generally connected to a central processing unit (CPU) which also controls the operation of the control unit 17.

Figure 2:
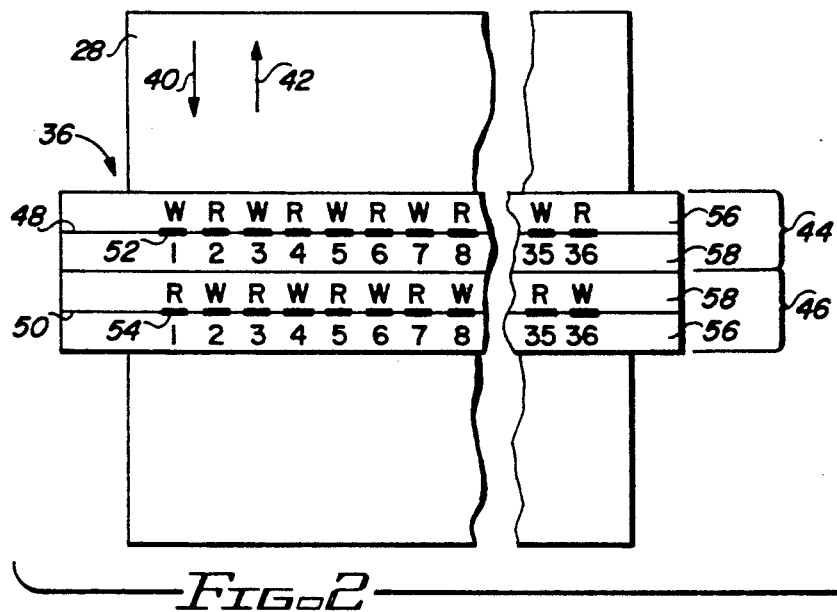
FIG. 2 is a top view of a length of magnetic tape and its relationship to an interleaved head.

FIG. 2 shows a top view of the interleaved magnetic head according to the present invention.

The head to be used in the practice of the present invention can also take the form of any of a number of well known construction types and arrangements. However, thin film construction is preferred. By the use of photolithography, it is possible to maximize use of the surface of the media, since narrow, closely placed, tracks can be written. The present invention provides the advantage that transversely adjacent head elements are not operative at the same time, thus minimizing the possibility of cross-talk and the like. In the preferred embodiment of a thin film transducer used for the magnetic head 36, the write element is an inductive write element comprising two blocks of magnetic ferrite driven by a thin film coil formed by the standard photolithographic steps. The preferred read element is a magneto-resistive (MR) element. It is also preferred that such MR read gaps be of the soft film biased type, well-known to those skilled in the art. It is also preferred that the head construction implement the well known write-wide read-narrow format.

Referring now to FIG. 2, the read elements are marked R for the magnetic head 36 while the write elements are marked W. The read and write gaps are used in immediately alternating, odd/even fashion. The term alternating is intended to include other formats. For example, it is the preferred embodiment of the present invention to provide a format of 36 tracks across the width of the media, hereinafter called tape media. One format provides that the odd numbered tracks, tracks 1, 3, 5, and so forth are operative during forward tape movement, while the even number tracks 2, 4, 6, 8 and so forth are operative during the opposite direction of the movement of the tape media. Other formats useful in the practice of the present invention will of course be evident to those of skill in the art, and are considered to be within the teaching of the present invention. The same reference numerals indicate like structural features and operations in the various figures of the drawings.

In general, referring to FIG. 2, the length of magnetic tape 28 moves in both a forward and a reverse direction as indicated by the arrows 40 and 42. The arrow 40 designates the forward movement direction of the tape 28 and the arrow 42 designates the reverse direction. The magnetic tape 28 operates in transducing relationship with the magnetic head 36 in the standard well-known format. The magnetic head 36 includes two modules 44 and 46 of generally identical construction. These two modules are mounted together to form a single physical unit. In this manner, the transducing gaps of one module are not only closely spaced to the transducing gaps of the other unit, but also, the module gaps are accurately aligned in the direction of tape movement.

Figure 3:
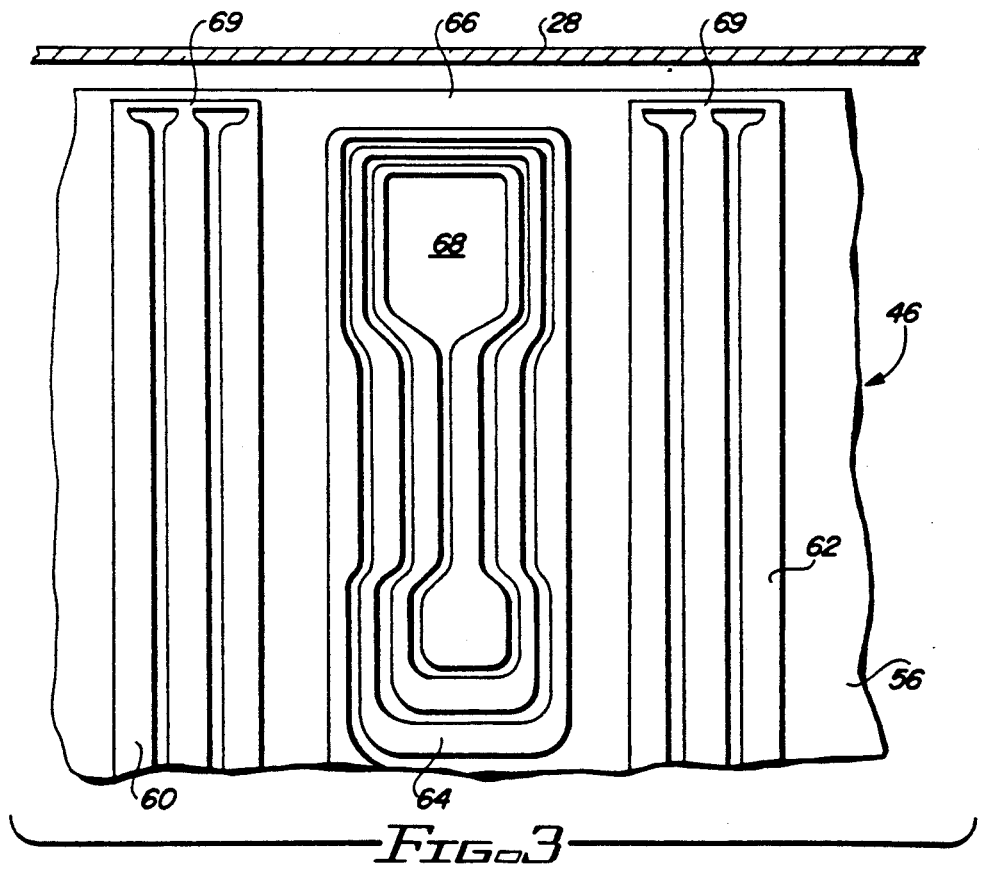
FIG. 3 is a sectional view of a portion of an interleaved head of the present invention.

In the exemplary magnetic head 36 of FIG. 2, each module includes one gap line 48 and 50 of modules 44 and 46, respectively, to form the single physical unit of magnetic head 36. The individual gaps of each module are accurately located along the gap lines 48 and 50. As those skilled in the art will appreciate, it is essential that gap lines 48 and 50 be parallel, and that the head be mounted to the tape drive, as shown in FIG. 1, in an accurate manner such that the gap lines 48 and 50 are perpendicular to the direction of tape media movement as represented by the arrows 40 and 42. The magnetic head 36 includes the alternating read/write gaps along the length of each of the gap lines 48 and 50 for each of the modules 44 and 46. There are 18 read transducers and 18 write transducers in each of the modules 44 and 46. Magnetic tape 28, therefore, has 36 tracks across its one half inch width. The tracks are written about 35 percent wider than the read gaps are able to read. The gaps of one module, module 44 for instance, cooperate with the identically numbered gaps of the module 46. Thus the gaps identified as "1" through "36" of module 44 cooperate with the gaps identified as "1" through "36" of the module 46. The read gaps of one module are aligned with the write gaps of the other module. Thus a write gap 52 of module 44 is aligned with a read gap 54 of the module 46. The write gap 52 writes a 35 percent wider track 1 onto the magnetic tape 28 and this track 1 is then read by the read gap 54 of the module 46. Each of the modules 44 and 46 include a ferrite substrate 56 and a ferrite closure piece 58. Referring to FIG. 3, a portion of the thin film structure of the head is shown. The module 46 is shown in cut away section with the thin film deposited onto the substrate 56 of the module 46. Two magneto-resistive (MR) read elements 60 and 62 are shown deposited onto the substrate 56. One thin film write coil 64 is shown positioned adjacent to the MR elements. The transducing gap of the ferrite substrate 56 is shown at reference numeral 66. A back gap region 68 completes the magnetic circuit that is energized by the write coil 64. The ferrite closure 58 (not shown) is then affixed to the ferrite substrate 56 to complete the module 46 and thereby form the adjacent read and write elements as is shown in FIG. 2. As stated previously, the module 44 is essentially of similar construction to that of module 46.

Figure 4A:
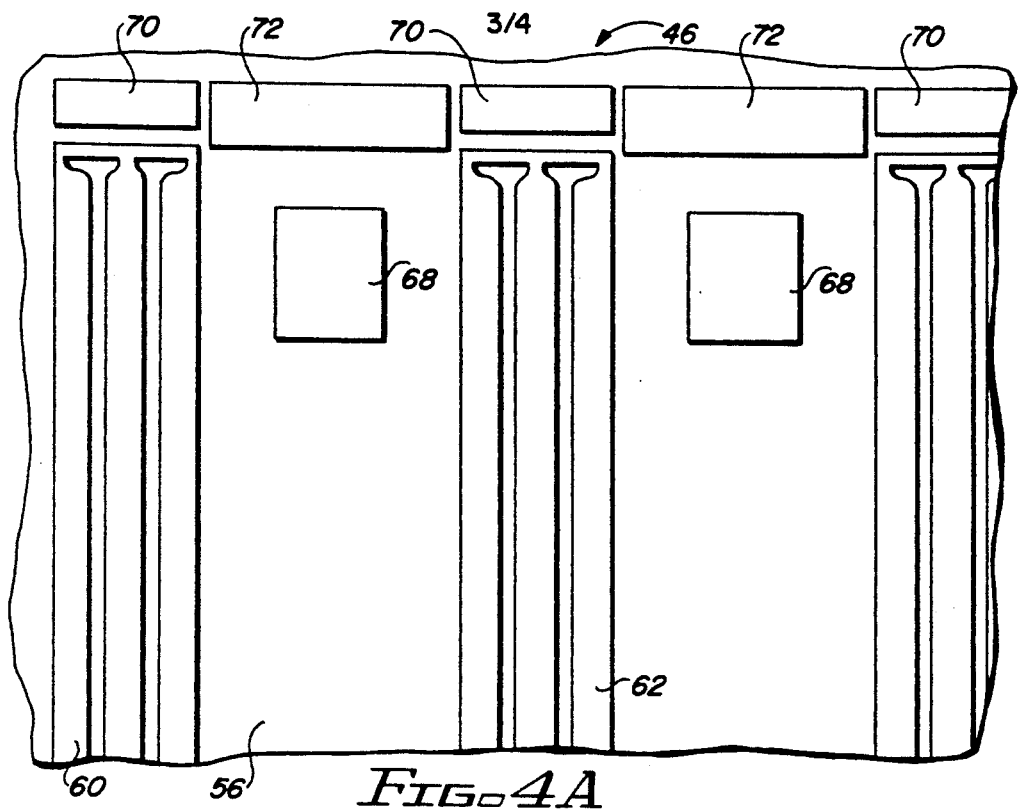
FIGS. 4A-C are the mask drawings used to deposit the different layers forming several tracks of the interleaved head.
Figure 4B:
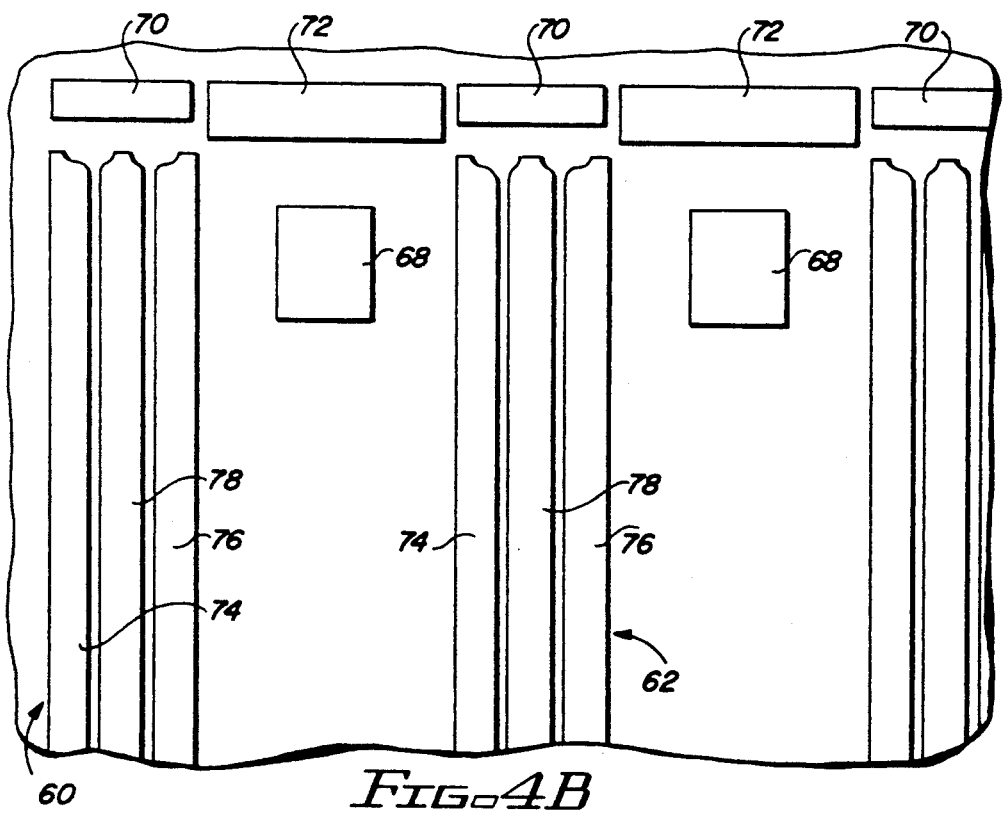
Figure 4C:
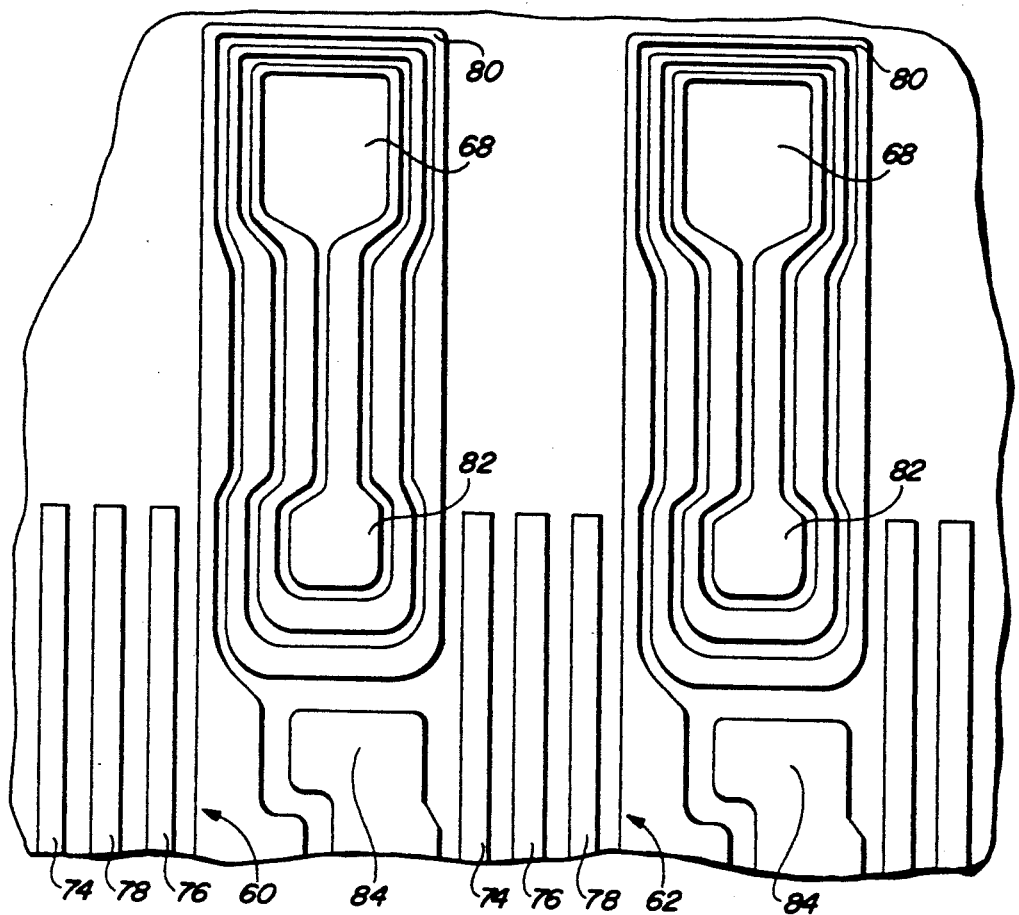

The steps in forming the inventive structure of the module 46 according to the present invention is shown in FIGS. 4A–C. In producing the different thin film layers for the MR read elements 60 and 62 and in producing the write coil 64 of FIG. 3, different thickness of layers are required for the operation of each. For instance, the MR read elements 60 and 62 require more thin film layers and, therefore, is thicker than the write coil 64 which operates to write the magnetic transitions onto the media 28. Thus, when the closure block 58 (see FIG. 2) is placed over the thin film layers, the ferrite closure will be supported by the layers of the MR read elements 60 and 62 but will not be supported by the write coil 64. As stated previously, this could lead to the ferrite closure 58 bending under stress after the module 46 is closed. The total film layers in the read gap are thicker then the total film layers in the write gap. To properly read the written bits of information on the tape media 28, the write head gap 66 must not be narrower than the MR read elements 60 and 62. The problem is solved according to this embodiment of the present invention by depositing islands of material of similar thickness to the MR read elements 60 and 62 at the back gap 68 region. Thus, the magnetic head 36 and especially each module 46 and 44 include a back gap write island (not shown in FIG. 3) in the back gap 68.

Referring now to FIG. 4A, the read tracks are defined. First an insulation layer of silicone dioxide and/or alumina is deposited over the entire substrate layer. The insulation layer can be a combination of silicone dioxide and aluminum deposited to a total thickness of approximately 6,000 angstroms. In the next step, the layers of the MR elements are deposited such as is shown for the MR elements 60 and 62. All of the MR elements are deposited at the same time covering the entire ferrite substrate 56 for the module 46. For the preferred embodiment of the magneto-resistive element, a NiFeRh layer of approximately 360 angstroms is deposited followed by a 200 angstrom layer of Ta and a 540 angstrom thickness layer of NiFe. The tri-layer for the MR element includes the NiFe MR layer itself together with the Ta isolation layer and the NiFeRh soft film bias layer. The operation of such an MR element is well known in the art and will not be further described here. At the same time that the MR elements are deposited onto the substrate 56, the same layers are deposited onto read islands 70, write islands 72, and back gap write islands deposited into the write back gap regions 68. This is the first portion of the leveling for the magnetic closure block to be placed over the entire thin film deposition as will be described later. A mask is used to define the read tracks and to define the different islands. The next step in the procedure is shown in FIG. 4B.

Referring to FIG. 4B, the next step is the deposition of the conductor layers onto the read legs up to the MR element itself. A mask is used to define the deposition of an adhesion layer of Ti of approximately 100 angstroms followed by the gold conductor layer of approximately 1000 angstroms followed again by an adhesion layer of 50 angstroms. These conductor layers are deposited over the read islands 70, the write islands 72, and the back gap write islands formed in the back gaps 68. The MR elements according to the preferred design are center tapped and, therefore, each MR element has three conductors, two outer conductors 74 and 76 and a center conductor 78. The same conductor layers are deposited over all of the read elements, with the read elements 60 and 62 shown in FIG. 4B. Next an insulation layer is deposited over the entire substrate to prepare for the deposition of the write conductors and the extensions of the read conductors onto the read legs. The formation of the write conductors and the further conductor regions on the read legs is shown in FIG. 4C.

As shown in FIG. 4C, the insulation layers are chemically etched to expose the write conductor region 80 of each of the write transducers and also to expose a portion of the read legs 74, 76 and 78 of the MR read elements 60 and 62, further portions shown in FIG. 4B. The write conductors are then deposited together with a thicker conductor deposition onto the read legs, as shown in FIG. 4C, by depositing an adhesion layer of Ti to an approximate 500 angstrom thickness followed by approximately 9000 angstrom thickness of gold. Note that deposition of material is not placed into the write back gap regions 68 nor onto the read islands 70 or write islands 72 The closure block 58 (see FIG. 2) when affixed to the substrate 56 extends in width approximately to the thick leg portions of the read conductors so that these thicker layers do not affect the gap lengths between the substrate 56 and the closure block 58. Further deposition steps (not shown) form an insulation layer for the crossover from a pad 82 of the write conductor 80 to the external pad 84. The crossovers are then deposited to interconnect the paths 82 and 84 together with any other conductors necessary in order to connect the write conductors and the read conductors to the read/write network 15 (see FIG. 1). The crossovers are encapsulated into an insulation material to insulate the conductors from the housing and other structures of the module 46. A cross section view showing the resultant islands just prior to the installation of the ferrite closure block is shown in FIG. 5.

Figure 5:
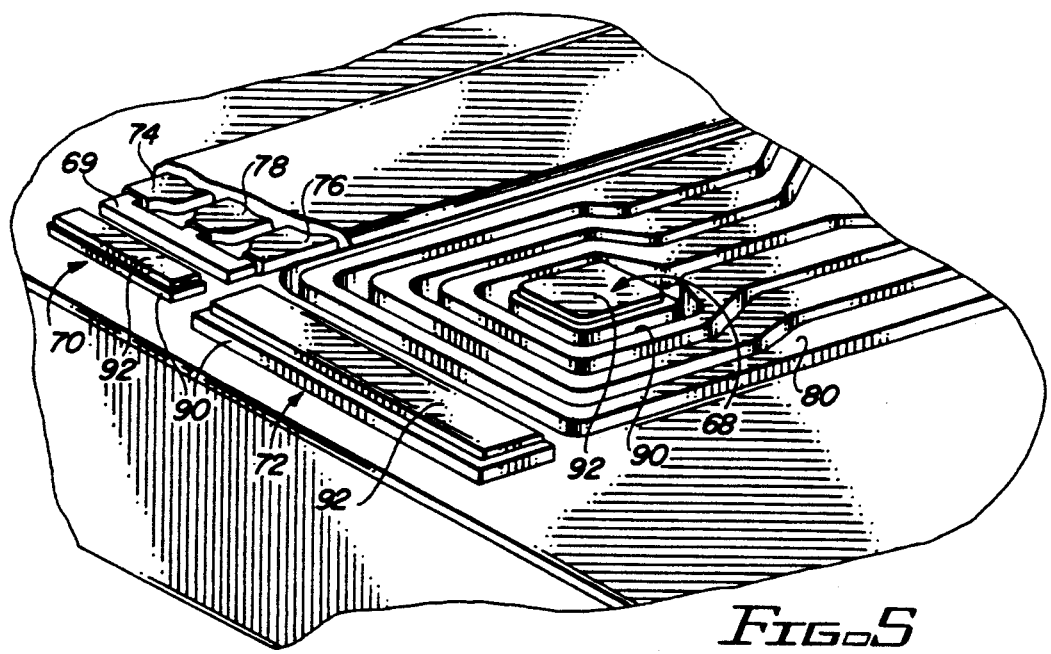
FIG. 5 is a perspective view of a portion of the transducers produced by the steps of FIGS. 4A-C, showing the present invention.

In FIG. 5, an active MR section 69 of the MR read element 60 is shown connected to the conductors 74, 76, and 78. The read island 70 is shown deposited adjacent the active MR section 69. The write conductors 80 surround the back gap section 68. The write island 72 is shown at the end of the conductors 80 adjacent to what will be the active write gap area 66 (see FIG. 3) after abrading is performed to the completed module 46 which includes the ferrite closure 58. The abrading determines the contour of the face of the module that interfaces with the tape media 28 (see FIG. 3) as well as the height of the active MR section 69 of the MR read element 60. The write islands 72 as well as the read islands 70 are removed by the abrading step.

The write back gap island in the write back gap area 68, the read island 70, and the write island 72 include a layer 90 of the same material of the layers of the active MR read element 69, and a conductor material 92 which is deposited over the conductors 74, 76, and 78 for the read element as is shown in FIG. 4B, but does not include the conductor material deposited as shown in FIG. 4C. These islands support the ferrite closure 58, see FIG. 2, when the ferrite closure block is placed over all of the elements deposited by the procedure shown in FIGS. 4A-C. The ferrite closure 58 becomes the second pole piece for the writing procedure as energized by the write conductors 80. The ferrite closure 58 also operates as a shield to the read elements of the MR read head 60 in a manner well known to those skilled in the art.

Thus, as is disclosed herein, an improved interleaved head is shown for use for media recording. It is, of course, understood that a single module could be used with the media recording drive of the present invention. In the embodiment disclosed, the layers of the read element are thicker than the thin film layers of the write element and therefore a supporting structure, the write back gap island in write back gap area 68, is provided to support the supporting structure, the substrate 56 and closure 58 of the module 46. The supporting structure need not be magnetic ferrite if thin film read and write elements are provided. It should also be understood that supporting islands could be provided in the read element area if the write element materials provide a larger write gap. The purpose of this invention being that supporting islands can be included to provide a constant distance between the supporting structure of a multi-gap head. Preferably, the material for the islands is the same as that of the longer gap element. It should be further understood that the supporting islands could be only magnetic material in order to independently vary the magnetic properties of the read or write gaps containing the islands.

The principles of the present invention have now been made clear in an illustrated embodiment. There will be immediately obvious to those skilled in the art many modifications of the structure, arrangement, proportion, the elements, materials and components used in the practice of the invention. For instance, a nickel-zinc ferrite material is shown for use in the ferrite substrate 56 and the ferrite closure 58 for the present invention. It should be understood that other magnetic ferrite material could be used such as a manganese-zinc ferrite, or non magnetic ceramics if the read and write thin film elements are self operational. Further, specific materials are used in the creation of the different layers for the thin film elements and conductors. It is well within the knowledge of a person skilled in the art that other materials could be used as well as other thicknesses, all well within the total lithographic teachings of the prior art. The different masks and photolithographic treatments to form the different layers are also well known. The appended claims are, therefore, intended to cover and embrace any such modifications within the limits only of the true spirit and scope of the invention.

What is claimed is:

1. A data transducing head module having one transducing gap line extending normal and adjacent to a magnetic media, the gap line including a plurality of alternating write and read gaps, said head module comprising:
   a substrate and a closure of a magnetic ferrite material, said substrate and closure providing the plurality of write gaps at one edge adjacent the media and a plurality of write back gap regions a distance from the media, perpendicular to the one edge;
   a plurality of thin film read transducers providing the read gaps;
   a plurality of read transducer conductors providing electrical connections to said read transducers;
   a plurality of write coils, one around each write back gap region; and
   a plurality of write back gap islands, one provided in each write back gap region, each island substantially enclosed in a plane by at least one write coil, said island of a same material and thickness as the read transducer and conductor;
   said islands providing mechanical support for the closure relative to the substrate.

2. A data transducing head module as defined in claim 1 wherein the plurality of thin film read transducers are magneto-resistive read elements.

3. A data transducing head module as defined in claim 2 wherein the write islands in the write back gap include a same material as in the magneto-resistive read elements and the conductors to the read elements.

4. A data transducing head module as defined in claim 1 wherein the substrate and closure are made from blocks of nickel-zinc ferrite.

5. A data transducing head module as defined in claim 1 wherein the plurality of write coils are at least one thin film layer of electrically conducting material.

6. A magnetic head comprising:
   at least one head module each having one transducing gap line extending normal and adjacent to a magnetic media for transducing operation therewith, each gap line including a plurality of alternating write and read gaps;
   each of said head modules including:
   a substrate and a closure of a magnetic ferrite material and providing the plurality of write gaps at one edge adjacent the media and a plurality of write back gap regions a distance perpendicular from the write gaps and the one edge;
   a plurality of thin film read transducers providing the read gaps;
   a plurality of read transducers conductors providing electrical connections to said read transducers;
   a plurality of write coils, one around each write back gap region; and
   a plurality of write back gap islands, one provided in each write back gap region, each island substantially enclosed in a plane by at least one write coil, said islands of a same material and thickness as the read transducer and conductors;
   said islands providing mechanical support for the closure relative to the substrate.

7. A magnetic head as defined in claim 6 wherein the plurality of thin film read transducers are magneto-resistive read elements.

8. A magnetic head as defined in claim 7 wherein the write islands in the write back gap include a same material as in the magneto-resistive read elements and the conductors to the read elements.

9. A magnetic head as defined in claim 6 wherein the substrate and closure are made from blocks of nickel-zinc ferrite.

10. A magnetic head as defined in claim 6 wherein the plurality of write coils are at least one thin film layer of electrically conducting material.

11. A magnetic head as defined in claim 6 including two head modules placed together such that the transducing gap lines of each one are parallel and the write gaps from one module are opposite to the read gaps from the second module and the read gaps from the one module are opposite to the write gaps of the second module.

12. A data transducing head module having one transducing gap line extending normal to the media movement direction, the gap line including a plurality of alternating write and read gaps, said head module comprising:
   a substrate made of a magnetic ferrite material;
   an insulating layer deposited on said substrate;
   patterned magneto-resistive layers deposited on said insulating layer and producing a plurality of magneto-resistive read elements at the read gaps and producing back gap write islands;
   a patterned conductive layer deposited on each magneto-resistive layers and over the islands;
   a patterned second insulating layer deposited on each pattern conductor layers such that write track regions and read leg regions are exposed;
   a read and a write conductor deposited onto each patterned write track region and read leg region;
   a read and a write interconnecting layers deposited to connect each read and write conductor to a data transmitting means; and
   a magnetic ferrite closure piece covering all of the plurality of alternating write and read gaps of said transducer, said magnetic ferrite closure forming a first write pole piece and a read gap shield and said substrate providing the second write pole piece;
   wherein said back gap write islands are each substantially enclosed in a plane by at least one write conductor and provide mechanical support for said magnetic ferrite closure piece.

13. A media drive comprising:
   a transducer;
   means for moving a media past said transducer;
   means for transmitting data to and receiving data from said transducer;
   said transducer including:
   at least one head module each having one transducing gap line extending normal and adjacent to a magnetic media for transducing operation therewith, each gap line including a plurality of alternating write and read gaps,
   each of said head modules including:
   a substrate and a closure of a magnetic ferrite material and providing the plurality of write gaps at one edge adjacent the media and a plurality of write back gap regions a distance perpendicular from the write gaps and the one edge;

a plurality of thin film read transducers providing the read gaps, a plurality of read transducers conductors providing electrical connections to said read transducers;

a plurality of write coils, one around each write back gap region, and a plurality of write back gap islands, one provided in each write back gap region, each island substantially enclosed in a plane by at least one write coil, said islands of a same material and thickness as the read transducer and conductor, said islands providing mechanical support for the closure relative to the substrate.

14. A media drive as defined in claim 13 wherein two data transducing head modules are included, affixed to each other and wherein the write gaps of one module are aligned in the direction of the media movement with the read gaps of the other module.

15. A media drive as defined in claim 14 wherein the drive is a magnetic tape drive, said media is a magnetic tape, and said transducer is a magnetic transducer.

16. A media drive as defined in claim 14 wherein the read transducer include a magneto-resistive material.

17. A media drive comprising:
a transducer;
means for moving a media past said transducer;
means for transmitting data to and receiving data from said transducer;
said transducer including:
at least one data transducing head module having one transducing gap line extending normal to a media movement direction, each gap line including a plurality of alternating write and read gaps, each head module including:
a substrate made of a magnetic ferrite material,
an insulating layer deposited on said substrate, patterned magneto-resistive layers deposited on said insulating layer and forming a magneto resistive read element and back gap write islands,
a patterned conductor layer deposited on each magneto resistive layers and over the islands,
a patterned conductor layer deposited on each magneto resistive layers and over the islands,
a patterned second insulating layer deposited on each patterned conductor layers such that write track regions and read leg regions are exposed,
a read and a write conductor deposited onto each patterned write track region and read leg region,
a read and a write interconnecting layer deposited to connect each read and write conductors to said data transmitting means, and
a magnetic ferrite closure piece covering all of the plurality of alternating write and read gaps of said transducer, said magnetic ferrite closure forming a first write pole piece and a read gap shield and said substrate providing the second write pole piece,
wherein said back gap write islands are each substantially enclosed in a plan by at least one write conductor and provide mechanical support for said magnetic ferrite closure piece.

18. A media drive comprising:
a transducer;
means for moving a media past said transducer;
means for transmitting data to and receiving data from said transducer;
said transducer including:
at least one head module each having one transducing gap line extending normal and adjacent to a magnetic media for transducing operation therewith, each gap line including a plurality of alternating write and read gaps, the write gaps of a first length and the read gaps of a second length, one of the first and second lengths shorter than the other,
each of said head modules including:
a substrate and a closure of a ceramic material;
a plurality of thin film read transducer elements providing the read gaps and deposited on said substrate;
a plurality of write transducer elements providing the write gaps and deposited on said substrate; and
a plurality of gap islands provided, at least one island adjacent each of the gaps of the shorter one of the first and second lengths, said islands of a thickness as the read transducer and substantially enclosed in a plane by at least one different material in the instant the write gaps are shorter in length, said islands of a same material thickness as the write transducer substantially enclosed in a plane by at least one different material in the instant the read gaps are shorter in length,
said islands providing mechanical support for the closure relative to the substrate.

19. A magnetic head as defined in claim 18 including two head modules placed together such that the transducing gap lines of each one are parallel and the write gaps from one module are opposite to the read gaps from the second module and the read gaps from the one module are opposite to the write gaps of the second module.

20. A magnetic head as defined in claim 18 wherein said substrate and closure are made of a magnetic ferrite material which provide the plurality of write gaps at one edge adjacent the media, and the plurality of write transducer elements form write coils wrapped around a write back gap region, and the plurality of gap islands are provided, one in each write back gap region.

21. A data transducing head module having one transducing gap line extending normal and adjacent to a magnetic media, the gap line including a plurality of alternating write and read gaps, the write gaps of a first length and the read gaps of a second length, one of the first and second lengths shorter than the other, said head module comprising:
a substrate and a closure of a magnetic ferrite material, said substrate and closure providing the plurality of write gaps at one edge adjacent the media and a plurality of write back gap regions a distance from the media, perpendicular to the one edge;
a plurality of thin film read transducers providing the read gaps;
a plurality of read transducer conductors providing electrical connections to said read transducers;
a plurality of write coils, one around each write back gap region; and
a plurality of gap islands provided, at least one island adjacent each of the gaps of the shorter one of the first and second lengths, said islands of a same material and thickness as the read transducer and conductor and substantially enclosed in a plane by at least one different material in the instant the write gap are shorter in length, said islands of a same material and thickness as the write coils and substantially enclosed in a plane by at least one different material in the instant the read gaps are shorter in length;

said islands providing mechanical support for the closure relative to the substrate.

22. The data transducing head module as defined in claim 21 wherein the gap islands are magnetic materials in order to independently vary the read or write gap.

23. A magnetic head comprising:
at least one head module each having one transducing gap line extending normal and adjacent to a magnetic media for transducing operation therewith, each gap line including a plurality of alternating write and read gaps, the write gaps of a first length and the read gaps of a second length, one of the first and second lengths shorter than the other,
each of said head modules including:
a substrate and a closure of a ceramic material;
a plurality of thin film read transducer elements providing the read gaps and deposited on said substrate;
a plurality of write transducer elements providing the write gaps and deposited on said substrate; and
a plurality of gap islands, one provided adjacent each of the gaps of the shorter one of the first and second lengths said islands of a same material and thickness as the read transducer and substantially enclosed in a plane by at least one different material in the instant the write gaps are shorter in lengths, said islands of a same material and thickness as the write transducer and substantially enclosed in a plane by at least one different material in the instant the read gaps are shorter in length;
said island providing mechanical support for the closure relative to the substrate.

24. A magnetic head as defined in claim 23 including two head modules placed together such that the transducing gap lines of each one are parallel and the write gaps from one module are opposite to the read gaps from the second module and the read gaps from the one module are opposite to the write gaps of the second module.

25. A magnetic head as defined in claim 23 wherein said substrate and closure are made of a magnetic ferrite material which provide the plurality of write gaps at one edge adjacent the media, and the plurality of write transducer elements form write coils wrapped around a write back gap region, and the plurality of gap islands are provided, one in each write back gap region.

* * * * *